United States Patent [19]

Grosseau

[11] 4,128,151
[45] Dec. 5, 1978

[54] TRANSMISSION MECHANISMS FOR VEHICLES

[75] Inventor: Albert Grosseau, Chaville, France

[73] Assignee: Societe Anonyme Automobiles Citroen, Paris, France

[21] Appl. No.: 785,128

[22] Filed: Apr. 6, 1977

[30] Foreign Application Priority Data

Apr. 13, 1976 [FR] France .................. 76 10844

[51] Int. Cl.² ............................................. F16H 57/10
[52] U.S. Cl. ..................... 192/4 A; 192/4 C; 74/473 R
[58] Field of Search ............. 192/4 A, 4 C, 12 D; 180/77 R, 70; 74/473 R

[56] References Cited

U.S. PATENT DOCUMENTS

| 2,726,556 | 12/1955 | Greenlee ........................ 192/4 A X |
| 2,745,526 | 5/1956 | Saives ............................ 192/4 A |
| 3,382,956 | 5/1968 | Henry Biabaud ................ 192/4 A X |
| 3,400,790 | 9/1968 | Ruhl et al. ...................... 192/4 C X |
| 3,548,980 | 12/1970 | Schmidt et al. ................. 192/4 A X |

*Primary Examiner*—James F. Coan
*Attorney, Agent, or Firm*—Weingarten, Maxham & Schurgin

[57] ABSTRACT

The invention relates to the transmission mechanism of an automotive vehicle.

The mechanism comprises a drive shaft, an input shaft, a coupling, a reversing gear, means for applying a brake to the input shaft and means for selecting the operating condition of the reversing gear. The brake actuating means comprise a hydraulic circuit, incorporating a solenoid valve, the energizing circuit of which comprises a normally open switch and a normally closed switch. Means for closing the switch comprise a self-hold relay of which an energizing circuit incorporates contact pairs operated by the selection means.

7 Claims, 4 Drawing Figures

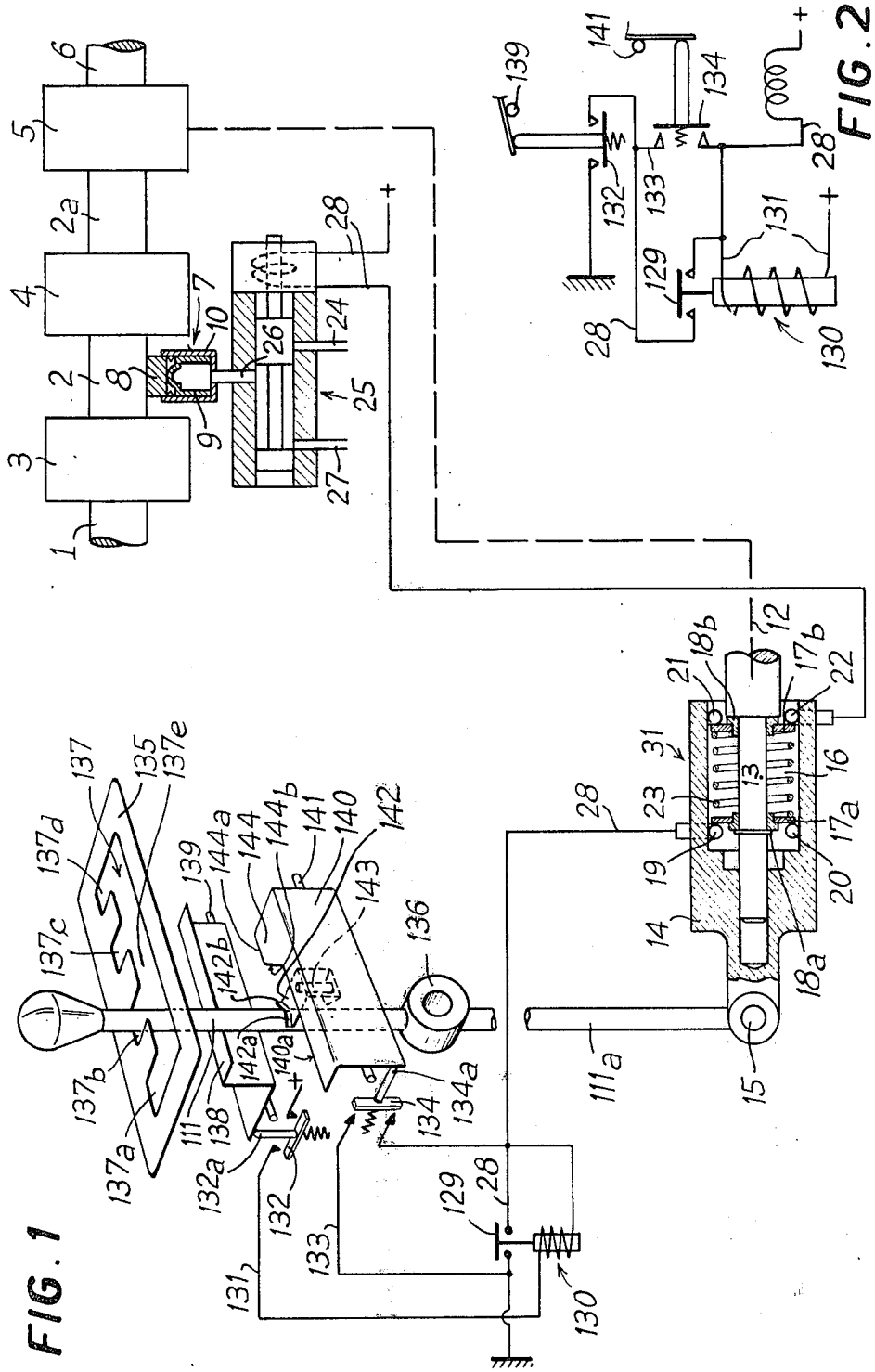

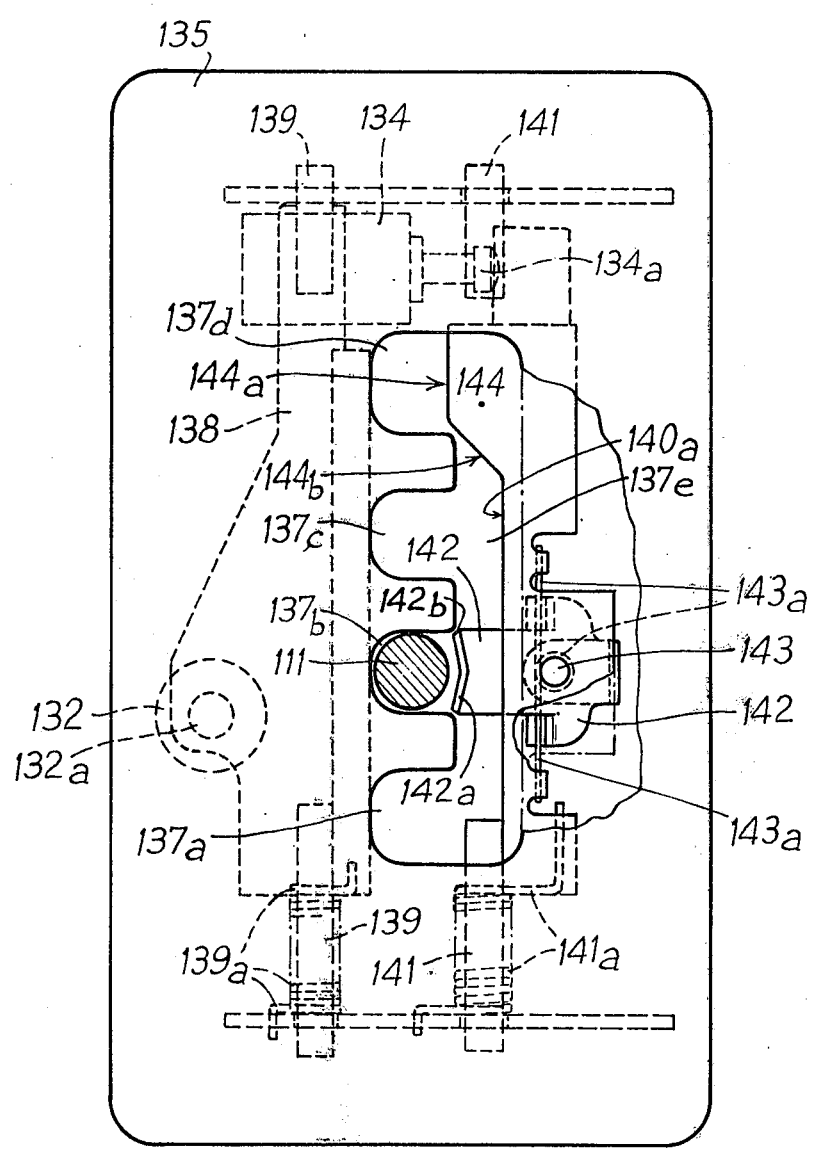

TRANSMISSION MECHANISMS FOR VEHICLES

CROSS-REFERENCE TO RELATED APPLICATION

United States patent application Ser. No. 647,603 in the name of Albert Grosseau described a mechanism for immobilisation of the input shaft of a reversing gear of a vehicle comprising, in its transmission, a coupling device generating a residual rotation, when the coupling is not operated to produce an operational output. The mechanism of the prior application enables complete immobilisation which gives rise to the advantage of prolonging the useful life of brake means used to brake the shaft liable to this residual rotation.

BACKGROUND OF THE INVENTION

1. Field of the Invention

This invention relates to an automobile transmission control arrangement and covers an improvement in the mechanism and control arrangement of application Ser. No. 647,603.

2. Summary of the Prior Art

The mechanism of the earlier application comprises a drive shaft, an input shaft of a change-speed gear, an output shaft for connection to the road wheels, a coupling device connecting the drive shaft and the input shaft of the change-speed gear, a reversing gear connecting an output shaft of the change-speed gear to the output shaft of the transmission, means for actuating a brake of the input shaft and means for selecting manually positions for "forward drive" or "reverse drive", and positions "neutral" and "parking brake" of the reversing gear by means of a linkage comprising a manual control lever. Again in accordance with application Ser. No. 647,603, the actuating means are constituted by a supply circuit for providing brake pressure fluid, in which is incorporated a solenoid valve normally interrupting this circuit when it is not energized and of which the electrical energizing circuit comprises at least one normally open switch movable to its closed position by the lever. The linkage comprises a resilient device capable of being compressed, when the applied control force on the lever reaches a predetermined value. According to one of the characteristics of the present invention, the switch is provided with a closure member constituted by a self latching relay of which the energizing circuit is closed by means co-operating with the lever, when the latter is operated to establish a connection between the input and output shafts of the reversing device.

According to a preferred construction, the means co-operating with the lever comprise a first pair of contacts in a first branch, termed a holding branch of the energization circuit of the said relay, capable of being interrupted by the said switch, which contacts co-operate with the lever so as to be open only when the lever is in one of the four positions "forward drive", "reverse drive", "neutral" and "parking brake", and by a second pair of contacts in a second branch of the energization circuit of the said relay, termed the starting branch, connected in parallel with the first holding branch at the terminals of the switch, the second contact pair co-operating with the lever so as to be closed only when the lever is moved in the sense of establishing, in connection with the reversing device, a connection between the input and output shafts of the reversing device.

BRIEF DESCRIPTION OF THE DRAWINGS

FIG. 1 is a diagram of one embodiment of the mechanism embodying the invention;

FIG. 2 is a diagram showing a circuit detail of the mechanism of FIG. 1;

FIGS. 3 and 4 are respectively a plan view and a sectional elevation of a control lever of the mechanism and an associated gate.

DESCRIPTION OF THE PREFERRED EMBODIMENT

Figure 3:
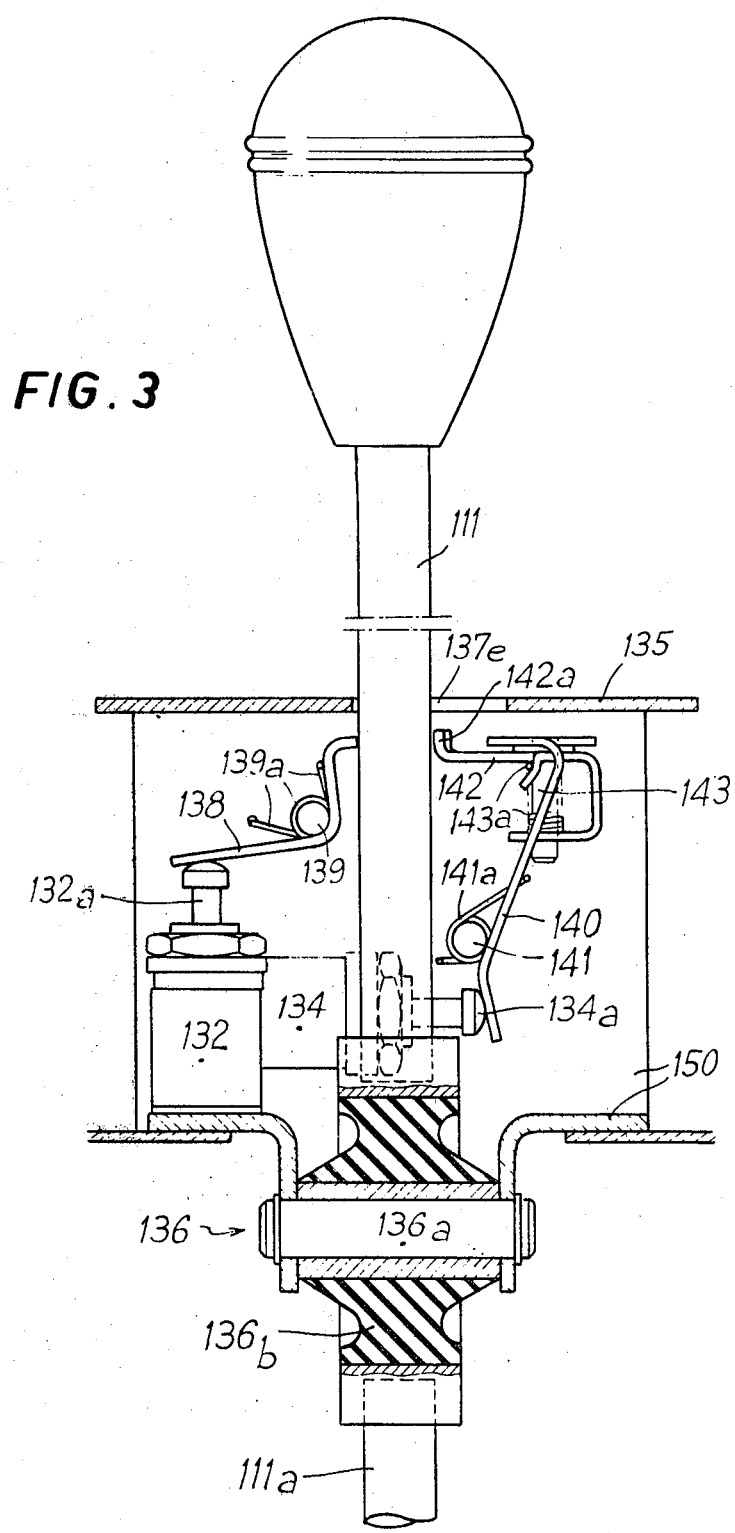

Referring first to FIG. 1 the mechanism comprises a drive shaft 1 and driven shaft 2 coupled by a hydraulic coupling 3 or torque converter. The driven shaft 2 serves to drive a change-speed device 4, for example an infinitely-variable change-speed gear or other variable transmission. The output shaft or intermediate shaft 2a of the gear 4 is connected to the input of a reversing gear 5 for reversing the direction of motion of the vehicle which includes an output shaft 6. Braking means 8 of the shaft 2 are shown only diagrammatically and in fact comprise a pad 8 capable of being held in contact with the shaft 2 under the action of a piston 9 slidably mounted in a cylinder 10 supplied with a fluid under pressure.

Control of the reversing gear 5 is provided by a selection device comprising a manually controlled lever 111 and a linkage 12 connected to the lever, of which linkage the end of a rod 13 has been shown.

Means included in the linkage connection are a cylindrical member 14 pivoted about a pin 15 carried by the end portion 111a of the lever 111.

The cylindrical member 14 has an internal chamber 16 receiving an end portion of the rod 13. The axial connection of the cylindrical member with the rod 12 is provided by means of two annular parts 17a and 17b spaced apart by means of a compression spring 23, lying between them. The annular parts 17a and 17b abut respective abutment elements 18a and 18b carried by the rod 13 and opposing one another and on two pairs of pegs 19, 20 and 21, 22 carried by the casing of the cylindrical member and projecting into the interior of the chamber 16. It will be noted that the distance separating the abutment planes of the annular parts 17a and 17b on the rod 13 must be at least equal to the distance separating the abutment planes of the said parts on the cylindrical member.

Means for actuating the brake 7 comprise a pressure fluid circuit including a supply pipe 24 connected to a pressure source, not shown, in which is incorporated a solenoid-operated valve 25 capable of establishing communication, in a first position, between the pipe 24 and a pipe 26 leading into the chamber 10 and, in a second position, communication between the pipe 26 and a drain pipe 27 connected to a reservoir (not shown) while at the same time cutting off supply from the pipe 24 in the second position. The first position corresponds to an energized condition of the solenoid valve whilst the second position is its de-energized or rest position.

The circuit 28 for energizing the solenoid-operated valve 25 comprises a first normally-open switch 129, and a second normally-closed switch 31. The second switch 31 includes, in fact, the peg 19 electrically connected to the circuit 28, the annular part 17a, the spring 23, the annular part 17b and the peg 22 likewise connected to the circuit 28. It will be noted that the pegs 19 to 22, the annular parts 17a and 17b and the spring 23 are insulated from the cylindrical member 31 and from the rod 13. Electrical continuity between the electrical elements is provided, in the rest condition of the device, by the action of the spring 23 which applies in this condition the annular parts 17a and 17b initially to the pegs 19 to 22, taking into account the spacing arrangement of the abutments hereinbefore set out.

The first switch 129 is caused to close by a self-hold relay 132. The supply circuit of this relay comprises a first branch 131 connected to a current source which includes in series the winding of the relay and switch 129. This first branch can be interrupted by a first pair of normally open contacts 132. The supply circuit also comprises a second branch 133 in parallel with the first branch 131 at the terminals of the switch 129. This second branch 133 includes a normally open pair of contacts 134. The first branch 131 will be termed the holding branch. When only the contact pair 132 is closed, the switch 129 will not be closed, since the relay 130 is not energized. In contrast, when the switch 132 and the contacts 134 are closed the relay 130 is energized, this energization being effected through the second branch 133, termed, for this reason the "switching-on" branch and energization will be continued in spite of opening of the contacts 134, the current then flowing through the branch 131 and the closed switch 129.

It will be apparent that the first branch of the energization circuit of the relay 130, referenced 131, 28 and 129, is a holding branch, whilst the second branch 133 is a switching-on branch.

The lever 111 passes through a selection gate 135 rigid with a support, not shown, the lever 111 being pivoted on this support by means of a flexible type joint indicated at 136 in FIG. 3. FIGS. 3 and 4 referred to hereinafter will indicate more exactly the operation of the lever, of the gate and of the support. The lever 111 traverses the gate 135 at at least one opening 137 having four notches 137a through 137d connected by a connecting zone 137e in which the lever 111 can be moved. The notch 137a corresponds to the position of the lever in which the reversing gear 5 is in "forward drive". Notch 137b is the notch corresponding to "neutral", notch 137c is the reversing notch and the notch 137d corresponds to the parking brake.

A plate 138 pivoted about a fixed pin 139 and orientated in a manner substantially parallel to length direction of the zone 137e is continuously applied against the lever 111 by means of a biasing device. A push-button 132a of the contacts 132 is held in contact by a resilient device below the plate 138.

A plate 140 pivoted about a fixed pin 141, extends substantially parallel to the pin 139, and carries a tongue 142. This tongue is pivoted about a pin 143 extending in a direction substantially parallel to that of the lever 111, the pin being subject to the action of the plate 140. Resilient return means not shown in this Figure, acting between the pin 141 and the plate 140 on the one hand, and, between the pin 143 and the tongue 142 on the other hand, bias the assembly into a rest position, in which a front upturned part 142a of the tongue 142 is just in the zone of the lever 111, when the latter is placed in the bottom of the notch 137b corresponding to the dead point of the reversing gear. For this reason, the lever 111 cannot leave the notch 137b without contacting the part 142a of the small tongue 142.

A push-button 134a of the contacts 134 is held by the action of a resilient member in contact with a lower part of the plate 140. The plate 140 includes a horizontal part 144 of which the edges 144a and 144b are arranged to co-operate with the lever 111, when the latter is moved into the zone 137e adjacent to the notch 137d in the sense "out of" or "in the direction of" this notch 137d. Finally, the edge 140a of the plate 140 is spaced sufficiently far from the lever 111 that, even when the latter is moved into the zone 137e of the gate 135, there can be no direct contact between the lever 111 and this edge.

It will be assumed, as shown, that the lever is in the "neutral point" position. A resilient member holds the lever in the bottom of one of the notches 137a to 137d. It will be apparent from FIG. 3, that this resilient member is disposed in the pivot arrangement 136. In this position the lever 111 determines the angular position of the plate 138 about its pin 139 so that the push-button 132a is forced in and that the contacts 132 are therefore open. The plate 140 is itself in its rest position under the action of the resilient return member, not shown, which acts at the pin 141, which results in contacts 134 remaining open under the action of the corresponding member.

In order to pass from the notch 137b to the notch 137a the lever 111 is moved first towards the zone 137e. By this action, the small plate 138, under the action of its return spring pivots so that the contacts 132 close. During this movement out of the notch 137b towards the zone 137e, the lever 111 is in contact with the part 142a at the front of the tongue 142 after it has left the bottom of the notch 137b. By this action the plate 140 pivots about its pin 141 whilst encountering its resilient return member and causes the closure of the contacts 134 through the intermediary of the push-button 134a. At this instant, the energization circuit of the relay 130 is closed and the first switch 129 closes. Through the circuit 28 the solenoid valve 25 is energized which changes its state and enables the supply of the brake 7 of the shaft 2.

After having left the notch 137b, the lever 111 lies in the zone 137e connecting this notch to the notch 137a for forward drive. This movement causes no supplementary pivoting of the plate 137 since the pin 139 is substantially parallel to the length direction of the zone 137e. During this movement, the tongue 142 is pivoted about its pin 143 until the instant when it escapes from the action of the lever 111 and returns into its initial position under the action of a resilient return member (FIG. 3). When the tongue 142 escapes from contact with the lever 111, the plate 140 returns to its rest position under the action of its resilient return member and the contacts 134 open. The relay 130 is not for this reason de-energized since the relay is a self-latching relay and it will be seen to be so since the contacts 132 and the switch 129 are closed, the relay 130 is continuously energized. The brake is then continuously applied to the shaft 2.

The lever 111 is finally moved towards the bottom of the notch 137a which causes the pivoting of the plate 138 about the pin 139 until it encounters its return device thereby causing the depression of the push-button 132a and opening of the contacts 132. The relay 130 is then switched off and the first switch opens. The brake is no longer energized.

Similar operations take place when the lever 111 is moved in order to pass into the notch 137b from the notch 137c for rearwards drive.

It will now be assumed that the lever 111 is at the bottom of the notch 137a and that it is moved, from this notch in the direction of "neutral" notch 137b. In the phase of this maneuver, consisting in moving the lever into the zone 137e of the selection gate 135, pivoting of the plate 138 is caused about its pin 139 under the action of its return device and thus the closure of the contacts 132. During this movement the lever will not touch the plate 140 since the tongue 142 does not lie opposite the notch 137a, and the edge 140a of the plate is such that the lever, moving in the aforesaid zone 137e cannot contact it. The contacts 134 are therefore not closed which prevents the energization of the relay 130 and holds the first switch 129 open. The lever 111 leaves the notch 137a, slides along the zone 137e so that it can be introduced into the notch 137b, the plate 138 being held in its closed position for the contacts 132. The lever 111 contacts the tongue 142 by one of its sides. The tongue, being rotatably mounted on the pin 143, pivots about this pin under the action of the lever without causing the plate 140 to pivot, and thus enabling the passage of the lever to the bottom of the notch 137b, which results in a change in the position of plate 138 and opening of the contacts 132. It will be seen that in this movement of the lever 111, the actuation of the brake has not been initiated. Similar remarks apply to the movement of the lever from the bottom of the notch 137c to the notch 137b.

It can now be assumed that movement of the lever 111 is to be effected from the notch 137a to the notch 137c without passing through the "neutral" notch 137b. In this case, the lever 111 acts on the side of the tongue 142 so as to impart to it a substantially greater rotational movement than previously described, thus bringing the edge 142b of the front part 142a into contact with the edge 140a of the plate 140. The movement of the tongue 142 with respect to the plate 140 is then terminated and, in this position, the tongue 142 acts as a cam surface which, during passage of the lever, causes pivoting of the plate 140 thereby closing the contacts 134. Since the contacts 132 are closed because the lever lies in the free zone 137e of the selection gate, the relay 130 is energized, the first switch 129 is closed and the brake 7 is actuated. Similar remarks apply to movement of the lever from the notch 137c to the notch 137a.

Finally, when the lever 111 is engaged in the notch 137d, closure of the contacts is effected initially, the lever reaching the notch 137d through the zone 137e and, then, the contacts 134 are closed by pivoting the plate 140, when the lever acts on the edge 144b of the part 144 of the plate 140, so as to cause the plate to pivot. The engagement of the position "parking brake" then causes the brake 7 to operate, and the brake is released when the lever 111 enters the notch 137d.

It will be noted that the action of the brake 7 for the introduction of the lever 111 into the notch "parking brake" is superfluous. In a modification, not shown, of this mechanism the part 144 of the plate 140 is replaced by a tongue similar to the tongue 142, which will escape without moving the plate 140, during the introduction of the lever 111 into the notch 137d.

In order to leave the notch 137d, the lever co-operates with the edge 144a of the part 144 in the same manner as it co-operates with the front part 142a of the tongue 142 when it leaves the notch 137d. Pivoting of the plate 140 causes the contacts 134 to close, plate 138 to pivot as for every time that the lever is disengaged from one of the notches. The brake 7 is then brought into operation and held in operation, whatever the position of the lever in the zone 137e, although the latter has not been placed in a notch corresponding to the wishes of the driver, by the operation of the self-hold branch circuit of the relay 130.

It will thus be seen the transmission mechanism enables the brake 7 to be brought into operation each time that, by means of the lever 111, a connection is established between the shaft 2a and the shaft 6 within the reversing gear 5. It can also be said that the brake 7 is also actuated when the possibility of establishing this connection exists.

In FIG. 2 a modification of the embodiment of the circuit for energizing the relay 130 is shown. The contacts 132, it will be noted, instead of being connected in the branch of the relay, are connected in the circuit 128 for energizing the solenoid valve. In this Figure certain parts as shown in FIG. 1 have been given the same reference numerals.

FIGS. 3 and 4 show in two views taken at right-angles to one another, a preferred embodiment of the control lever 111 provided with all the accessories with which it co-operates. In these Figures certain of the parts already described with reference to FIG. 1 will be given the same reference numerals. The resilient return members of the plate 138 are shown in these Figures, together with the plate 140 and the tongue 142, which are respectively constituted by spring 139a wound around the pins 139, spring 141a, wound around the pin 141 and spring 143a, wound around the pin 143. The pivot device 126 of the lever 111 on the support here referenced 150 is, in fact, constituted by a pin 136a rigid with the said support, on which the lever is pivoted by means of a resilient bearing bush 136b. The withdrawal of the lever from the notches 137a to 137d is made possible by the resilience of the bearing bush 136b, the action of which tends to oppose this withdrawal. The displacement of the lever 111 in the zone 137e of the opening 137 is also made possible by pivoting about the pin 136a.

The preferred embodiment provides the same advantages as the preferred embodiment of application Ser. No. 647,603. Moreover, it enables movement of the lever 111 which is simplified with respect to that of the lever 11 of application No. 647,603, while at the same time giving rise to a simpler construction and of operation with safer and greater robustness.

The invention is of importance in the automobile construction art.

I claim:
1. In a transmission mechanism for an automotive vehicle
   a drive shaft,
   a change-speed gear, including
      an input shaft,
      coupling means between the drive shaft and the input shaft of the change-speed gear,
   an output shaft coupled to road wheels of the vehicle,
   a reversing gear connected between the change-speed gear and the said output shaft,
   brake means operable to brake the input shaft of the change-speed gear,
   means for actuating the brake means,
   means for selecting operating positions "forward drive" and "reverse drive" and "neutral" and "parking brake" of the reversing gear, said selecting means comprising
   a linkage for effecting engagement in the said positions, including
      a manually-operable control lever,
      said actuating means comprising a circuit for supplying the brake with pressure fluid, said circuit incorporating, a solenoid valve normally interrupting the brake fluid circuit when the solenoid is de-energized, a solenoid valve energizing circuit including a first, normally open, switch movable to its closed position by said control lever, a self-hold relay operable to close the first switch, an energizing circuit for energizing the self-holding relay comprising:

a first, hold, branch interruptable by said first switch, a second, starting, branch connected in parallel with the first branch across said first switch, the first branch including a first contact pair co-operating with the lever so as to be open only when the lever is in one of the positions "forward drive", "reverse drive", "neutral" or "parking brake", the second branch including a second contact pair co-operating with the lever so as to close only when the lever is moved in direction to establish a connection between said input and output shafts.

2. A mechanism according to claim 1, comprising a support for the manually-operable lever, a universally-movable joint carrying the lever and mounting the lever on the support, a selection gate traversed by said lever and having a slot defining four notches for holding the lever in each of the aforesaid positions and an elongate free zone connecting the notches, a first actuating rod of the first contact pair carried by the support, a first plate pivoted on the support about an axis parallel to the length of said free zone, means biasing the contacts actuating rod against the first plate whereby the contacts are held open when the lever is engaged in one of the said notches, a second actuating rod of the second contact pair, a second plate pivoted on the support about a second axis parallel to the length direction of the free zone, means biasing the second actuating rod against the second plate, said second plate including a tongue pivotably mounted about an axis substantially parallel to the length direction of the lever, and extending opposite to the latter when the lever lies in the bottom of the notch corresponding to "neutral", the second plate being held by the biasing means in a position such that any movement of the lever out of the notches causes through the intermediary of the tongue, pivoting of the plate and consequent closure of the second contact pair.

3. A mechanism according to claim 2, comprising a biasing means acting on the tongue whereby the said tongue can be withdrawn by rotation about its pivot axis, when it contacts the lever in its path to the "neutral" notch.

4. A mechanism according to claim 3, wherein said tongue, in its withdrawn position, serves as a cam surface co-operating with the lever is moved into the said free zone between the "forward drive" and "reverse drive" notches whereby to cause pivoting of the second plate and consequent closure of the second contact pair.

5. A mechanism according to claim 4, wherein the said second plate includes a cam surface co-operating with the lever when the latter is moved out of the "parking brake" notch so as to cause pivoting of the second plate and consequent closure of the second contact pair.

6. A mechanism according to claim 5, comprising a second tongue having a part serving to define the cam surface, the second tongue being retractable like the first-mentioned tongue.

7. A mechanism according to claim 5, wherein the surface of the said cam is in one piece with the second plate.

* * * * *